(12) United States Patent
Ezaki et al.

(10) Patent No.: US 8,999,049 B2
(45) Date of Patent: Apr. 7, 2015

(54) W/O EMULSION INK FOR INKJET

(75) Inventors: Naofumi Ezaki, Tokyo (JP); Kazuyuki Ando, Tokyo (JP); Shinichiro Shimura, Tokyo (JP)

(73) Assignee: Riso Kagaku Corporation, Tokyo (JP)

( * ) Notice: Subject to any disclaimer, the term of this patent is extended or adjusted under 35 U.S.C. 154(b) by 0 days.

(21) Appl. No.: 13/543,016

(22) Filed: Jul. 6, 2012

(65) Prior Publication Data

US 2013/0025496 A1 Jan. 31, 2013

(30) Foreign Application Priority Data

Jul. 7, 2011 (JP) ................................ 2011-151251

(51) Int. Cl.
C09D 11/02 (2014.01)
C09D 11/30 (2014.01)
C09D 11/023 (2014.01)

(52) U.S. Cl.
CPC .............. C09D 11/30 (2013.01); C09D 11/023 (2013.01)

(58) Field of Classification Search
USPC .......................................... 106/31.26, 31.25
See application file for complete search history.

(56) References Cited

U.S. PATENT DOCUMENTS

| 7,717,989 | B2 | 5/2010 | Okuda et al. | |
|---|---|---|---|---|
| 8,226,756 | B2 | 7/2012 | Akiyama et al. | |
| 2002/0002931 | A1* | 1/2002 | Nakano et al. | 106/31.58 |
| 2009/0090270 | A1* | 4/2009 | Okuda et al. | 106/31.26 |
| 2009/0196994 | A1* | 8/2009 | Endo | 427/256 |
| 2010/0092676 | A1* | 4/2010 | Uozumi et al. | 427/265 |
| 2010/0173079 | A1 | 7/2010 | Akiyama et al. | |
| 2011/0109687 | A1 | 5/2011 | Hara et al. | |
| 2012/0180695 | A1* | 7/2012 | Itabashi et al. | 106/31.25 |

FOREIGN PATENT DOCUMENTS

| CN | 101376756 A | 3/2009 |
|---|---|---|
| JP | 2006-056931 A | 3/2006 |
| JP | 2009-057462 A | 3/2009 |
| JP | 2011-099088 A1 | 5/2011 |

OTHER PUBLICATIONS

Chinese Office Action dated Jun. 27, 2014 issued in CN Application No. 201210212141.0.

* cited by examiner

Primary Examiner — Veronica F Faison
(74) Attorney, Agent, or Firm — Fitch, Even, Tabin & Flannery LLP

(57) ABSTRACT

A water-in-oil (W/O) emulsion ink which is suitable for use in inkjet printing and is superior in ejection performance and storage stability and low in viscosity is provided. A water-in-oil (W/O) emulsion ink which comprises a polyglycerin with a polymerization degree of not less than 3 in a water phase is provided. As an emulsifier, a polyglycerin fatty acid ester with an HLB value of 7-14 in which fatty acid moiety is oleic acid or isostearic acid, or a polyoxyethylene sorbit fatty acid ester is preferably used. The concentration of the polyglycerin in the water phase is preferably 10-70 mass % relative to 100 mass % of the whole water phase. The polymerization degree of the polyglycerin is preferably not less than 4.

10 Claims, No Drawings

W/O EMULSION INK FOR INKJET

CROSS-REFERENCE TO RELATED APPLICATION

This U.S. application claims the foreign priority filing date benefit of Japanese Application JP2011-151251, filed Jul. 7,2011, and the full disclosure of said Japanese application is incorporated herein by reference.

TECHNICAL FIELD

The present invention relates to a water-in-oil (W/O) emulsion ink which is suitable for use in inkjet printing, and is superior in ejection performance and storage stability and low in viscosity.

BACKGROUND ART

Inkjet printing is characterized by ejecting ink droplets from fine nozzles so as to perform non-contact printing. Companies have carried out R & D of inks for inkjet printing, aiming at making ink droplets finer and making printing speed faster and printing size larger.

As an ink used for inkjet printing (referred to as "ink for inkjet" in the present specification), an aqueous pigment or dye ink is generally used for personal and office uses. Because of high water-absorption of paper fibers, the aqueous pigment or dye ink exhibits high printing density thereon and is low in strike through which is a printing density seen from the backside of prints. On the other hand, since paper is dried under pressure during production, hydrogen bonds between paper fibers are cut to cause curl of paper when water contacts the paper. The curl is so remarkable as to influence accuracy of positioning of ink droplets and conveyance of paper when cut sheets of paper are used. It is prerequisite to eliminate the curl in order to achieve high speed printing.

As a technique for eliminating the curl, reducing the water content of the ink or removing water from the ink may be employed. In other words, oil based inks can be used to eliminate the curl, which are also suited for high speed printing.

Business printers which adopt a line head type inkjet system are noticed since they have the head fixed so as to produce a large amount of prints at high speed and are available at low price. An oil based pigment ink is usually used for this high speed inkjet printer. However, the ink permeates into the backside of paper after printing, and thus the resulting prints are low in printing density with lots of strike through, compared to printers adopting other systems.

Emulsifying an oil based ink with water to make a water-in-oil (W/O) emulsion ink is one of the methods for solving this problem (refer to Patent Document 1 and Patent Document 2). Although a polyglycerin hydroxy fatty acid ester with an HLB value of 3-5 is used as an emulsifier in the emulsion ink in Patent Document 1, ejection performance are not necessarily sufficient. Also, this emulsion ink is problematic in that it is high in viscosity for inkjet.

PRIOR ART

[Patent Document 1] JP-A-2006-56931
[Patent Document 2] JP-A-2009-57462

DISCLOSURE OF THE INVENTION

Problems to be Solved by the Invention

The object of the present invention is to provide a water-in-oil (W/O) emulsion ink which is suitable for inkjet printing and is superior in ejection performance and low in viscosity.

Means for Solving the Problem

As a result of diligent researches for the above mentioned purpose, the present inventors have found that a water-in-oil (W/O) emulsion ink for inkjet, which is superior in ejection performance and low in viscosity, can be obtained by allowing it to contain a polyglycerin with a polymerization degree of not less than 3 in the water phase thereof, and have completed the present invention.

That is, according to the present invention, there is provided a W/O emulsion ink for inkjet, which comprises a polyglycerin with a polymerization degree of not less than 3 in a water phase.

As an emulsifier, preferably contained is a polyglycerin fatty acid ester with an HLB value of 7-14 in which the fatty acid moiety is oleic acid or isostearic acid, or a polyoxyethylene sorbitol fatty acid ester.

The concentration of the polyglycerin contained in the water phase is preferably 10-70 mass % relative to 100% of the whole water phase.

Effect of the Invention

According to the present invention, a water-in-oil (W/O) emulsion ink superior in ejection performance and low in viscosity is obtained because a polyglycerin with a polymerization degree of not less than 3 is contained in the water phase of the water-in-oil (W/O) emulsion ink.

BEST MODE FOR CARRYING OUT THE INVENTION

Hereinafter, the present invention will be described in detail.

The water-in-oil (W/O) emulsion ink of the present invention is obtained by mixing an oil phase and a water phase so as to disperse the water phase as fine particles in the oil phase.

The oil phase is mainly composed of an organic solvent, a coloring agent and an emulsifier, but may contain other components if necessary.

Any of non-polar solvents and polar solvents may be used as an organic solvent. These solvents can be used alone or in combination of two or more on condition that they form a single phase.

As the non-polar solvent, petroleum based hydrocarbon solvents including naphthenic, paraffinic and isoparaffinic ones can be used. Concrete examples include dodecane and other aliphatic saturated hydrocarbons, "ISOPAR and EXXOL" (both trade names) available from Exxon Mobil Corporation, "AF solvents" (trade name) available from JX Nippon Oil & Energy Corporation, and "SUNSEN and SUNPAR" (both trade names) available from Japan Sun Oil., Ltd. These can be used alone or in combination of two or more.

As the polar solvent, ester solvents, alcohol solvents, fatty acid solvents and ether solvents can be used, for example. These can be used alone or in combination of two or more.

The ester solvents includes, for example, higher fatty acid esters having 5 or more, preferably 9 or more and more preferably 12 to 32 carbon atoms in one molecule. Examples include isodecyl isononate, isotridecyl isononate, isononyl isononate, methyl laurate, isopropyl laurate, isopropyl myristate, isostearyl palmitate, isooctyl palmitate, hexyl palmitate, isostearyl palmitate, isooctyl isopalmitate, methyl oleate, ethyl oleate, isopropyl oleate, butyl oleate, hexyl oleate, methyl linoleate, isobutyl linoleate, ethyl linoleate, butyl stearate, hexyl stearate, isooctyl stearate, isopropyl isostearate, 2-octyldodecyl pivalate, soybean oil methyl ester, soybean oil isobutyl ester, tall oil methyl ester, tall oil isobutyl ester, diisopropyl adipate, diisopropyl sebacate, diethyl sebacate, propylene glycol monocaprate, trimethylolpropane tri-2-ethylhexanoate, and glyceryl tri-2-ethylhexanoate.

The alcohol solvent includes, for example, aliphatic higher alcohols having 12 or more carbon atoms in one molecule. Concrete examples include higher alcohols such as isomyristyl alcohol, isopalmityl alcohol, isostearyl alcohol, and oleyl alcohol.

The fatty acid solvent includes, for example, fatty acids having 4 or more, preferably 9-22 carbon atoms in one molecule. Examples include isononanoic acid, isomyristic, acid, hexadecanoic acid, isopalmitic acid, oleic acid, and isostearic acid.

Examples of the ether solvents include glycol ethers such as diethyleneglycol monobutyl ether, ethyleneglycol monobutyl ether, propyleneglycol monobutyl ether and propyleneglycol dibutyl ether, and acetate of glycol ethers.

As a coloring agent, any of dyes and pigments can be used. These can be used alone or in combination.

As the pigment, pigments generally used in the printing industry, including organic and inorganic pigments, can be used without any particular limitation. Examples thereof include carbon black, cadmium red, chromium yellow, cadmium yellow, chromium oxide, viridian, titanium cobalt green, ultramarine blue, Prussian blue, cobalt blue, azo pigments, phthalocyanine pigments, quinacridone pigments, isoindolinone pigments, dioxadine pigments, threne pigments, perylene pigments, thioindigo pigments, quinophthalone pigments and metal complex pigments. These pigments may be used alone or in combination of two or more.

As the dye, water-soluble dyes such as azo, anthraquinone and azine based dyes or oil-soluble dyes can be used.

The coloring agent is contained preferably in an amount of 0.01 to 20 mass % based on the total of the ink.

When a pigment is used as a coloring agent, it is preferable to add a pigment dispersing agent to the oil phase in order to make good dispersion of the pigment in the oil phase. The pigment dispersing agents used in the present invention are not particularly limited as long as they can stably disperse the pigment in a solvent. Examples thereof include a hydroxyl group-containing carboxylic acid ester, a salt of a long-chain polyaminoamide and a high-molecular-weight acidic ester, a salt of a high-molecular-weight polycarboxylic acid, a salt of a long-chain polyaminoamide and a polar acidic ester, a high-molecular-weight unsaturated acid ester, a high-molecular-weight copolymer, a modified polyurethane, a modified polyacrylate, a polyetherester type anionic surfactant, a naphthalene sulfonic acid formalin condensate salt, a polyoxyethylene alkylphosphoric acid ester, a polyoxyethylene nonylphenyl ether, a polyesterpolyamine, a stearylamine acetate and the like. Among these, polymer dispersing agents are preferable.

Concrete examples of the dispersing agents include "SOLSPERSE 5000 (phthalocyanine ammonium salt based), 13940 (polyester amine based), 17000, 18000 (aliphatic amine based), 11200, 22000, 24000, and 28000" (all trade names) available from Lubrizol Japan Ltd.; "EFKA 400, 401, 402, 403, 450, 451, 453 (modified polyacrylate), 46, 47, 48, 49, 4010, 4055 (modified polyurethane)" (all trade names) available from Efka Chemicals; "DEMOL P, EP, POIZ 520, 521, 530, HOMOGENOL L-18 (polycarboxylate polymer type surfactants)" (all trade names) available from Kao Corporation; "DISPARLON KS-860, KS-873N4 (polyester amine salt)" (both trade names) available from Kusumoto Chemicals, Ltd.; and "DISCOL 202, 206, OA-202, OA-600 (multichain polymeric nonionic based)" (all trade names) available from Daiichi Kogyo Seiyaku Co., Ltd.

The pigment dispersing agents may be contained in an amount sufficient to disperse the pigment in the oil phase, and can be set properly.

The emulsifier is not particularly limited as long as it can form a water-in-oil (W/O) emulsion ink, and a nonionic surfactant is preferably used. The nonionic surfactant includes sorbitan higher fatty acid esters such as sorbitan monolaurate, sorbitan monopalmitate, sorbitan monostearate, sorbitan tristearate, sorbitan monooleate and sorbitan sesquioleate; fatty acid glycerides; polyglycerin fatty acid esters; fatty acid diglycerides; and ethylene oxide addition products of higher alcohols, alkylphenols and fatty acids. Of these, a polyglycerin fatty acid ester the fatty acid moiety of which is oleic acid or isostearic acid and which has an HLB value of 7-14 or a polyoxyethylene sorbitol fatty acid ester is preferably used. The polyglycerin fatty acid ester herein means an esterification product of a polyglycerin with a fatty acid.

The above polyglycerin fatty acid ester has a polyglycerin moiety with a glycerol polymerization degree of preferably 4-20, more preferably 6-16 and particularly preferably 6-12 and preferably has several (for example, 1-3) higher fatty acid moieties which are ester-bonded to one molecule of the above polyglycerin moiety. Also, the above polyglycerin fatty acid ester has an organic value of preferably 550-2300 and an inorganic value of preferably 600-2500. More preferably, it has an organic value of 590-1700 and an inorganic value of 600-1300. When the organic value is larger than 2300 or the inorganic value is larger than 2500, ink viscosity may become high. Preferred examples of the polyglycerin fatty acid ester include tetraglyceryl monooleate, hexaglyceryl monooleate, decaglyceryl trioleate, tetraglyceryl monoisostearate, hexaglyceryl monoisostearate and decaglyceryl diisostearate.

Meanwhile, the "organic value" and the "inorganic value" are based on the notion used in the "organic conception diagram" proposed by Atsushi Fujita, in which nature of organic compounds is categorized by two factors of "organic nature" derived from the chain of covalent bonds of carbon chains and "inorganic nature" derived from the influence of electrostatic properties in substituents (functional groups), and each factor is determined from the structure of compounds and converted to numerical values. Details of the "organic conception diagram" are described in "Systematic Qualitative Organic Analysis (Mixtures)", Atsushi Fujita et al., Kazama Shobo Co., Ltd. (1974).

HLB is a theoretical value calculated by the following equation.

$$HLB=[(\text{inorganic value}/\text{organic value})]\times 10$$

A polyoxyethylene sorbitol fatty acid ester means an esterification product of a polyoxyethylene sorbitol with fatty acids, wherein the polyoxyethylene sorbitol is produced by adding ethylene oxide to sorbitol. The average number of molecules of the added ethylene oxide is preferably 6-60, more preferably 10-50, furthermore preferably 20-45 and particularly preferably 30-40. As the fatty acid moiety, mention may be made of higher fatty acids with 9-22 carbon atoms in one molecule. Concrete examples include isononanoic acid, isomyristic, acid, hexadecanoic acid, isopalmitic acid, oleic acid, and isostearic acid. Of these, oleic acid or isostearic acid is preferable. A degree of esterification is preferably 1-5 and particularly preferably 3-5.

The amount of the emulsifier to be used in the present invention on solid mass basis is preferably 0.5 to 40 mass %, more preferably 1-30 mass %, and further more preferably 2-20 mass % based on the total amount of the ink. If it is less than 0.5 mass %, storage stability of emulsion may be lowered. Also, if it is more than 40 mass %, viscosity may become too high to be suitable for inkjet. In addition, the amount of the emulsifier to be used is preferably 5-70 mass % and more preferably 10-60 mass % relative to the amount of the oil phase.

The oil phase can be prepared, for example, by putting the components in a known dispersing machine such as a beads-mill wholly or bit by bit to obtain a dispersion and if necessary passing it through a known filtering machine such as a membrane filter. For example, it can be prepared by obtaining a mixture of a part of the solvent and the whole of the pigment and pigment dispersing agent and uniformly dispersing them in a dispersing machine, and then adding the rest of the components to the dispersion followed by filtering.

The water phase is composed of water in which a polyglycerin with a polymerization degree of not less than 3 is dissolved as an essential component, and may optionally contain a water-soluble dye, a metal salt, an electrolyte, a moisturizing agent, a water-soluble polymer, an oil-in-water (O/W) emulsion of resin, a fungicide, an antiseptic, a pH controller, a freeze preventing agent or the like.

Among the polyglycerin with a polymerization degree of not less than 3, one with a polymerization degree of 4-20 is more preferred, and one with a polymerization degree of 4-12 is particularly preferred. The polyglycerin may be one with a specific polymerization degree alone or may be a mixture of a plurality of polyglycerins which are different in polymerization degree from one another. The blending amount of the polyglycerin is preferably 10-70 mass % and more preferably 20-65 mass % relative to the whole water phase. When it is less than 10 mass %, the effect of lowering the viscosity may be difficult to obtain, and when it exceeds 70 mass %, ejection performance and storage stability may be deteriorated.

When the water phase contains a water-soluble dye, the amount thereof to be blended is preferably 0.5-15 mass % and more preferably 1-10 mass % relative to the whole amount of the ink. When it is less than 0.5 mass %, surface printing density may not be improved. Also, when it is more than 15 mass %, ejection performance may be deteriorated.

When the water phase contains a water-soluble dye as a coloring agent, a solubilizer is preferably added to the water phase. In this case, the dye which is dissolved at the molecular level permeates into and is adsorbed by paper fibers so that the coloring of the dye is improved. As the solubilizer, amine based surfactants are preferable. Examples of the amine based surfactant includes polyalkylene oxide adducts of organic amines such as ethylene oxides (EO) or propylene oxides (PO) adducts of alkyl amines, alkenyl amines, alkyl hydroxylamines, alkenyl hydroxylamines, oxyalkylamines, oxyalkenylamines or the like. Of these, ethylene oxides (EO) or propylene oxides (PO) adducts of alkyl amines are preferable. As such amine based surfactants, commercially available ones such as SOLSPERSE 20000, SOLSPERSE 27000, SOLSPERSE 46000 (all trade names) available from Lubrizol Japan Ltd., and TAMNO-15 (trade name) available from Nikko Chemical Corporation can be used. The amount to be blended of the solubilizer is preferably 0.1-10 mass % and more preferably 0.3-8 mass % relative to the total amount of the ink.

The water-in-oil (W/O) emulsion ink for inkjet according to the present invention can be produced by mixing and emulsifying the oil phase and the water phase.

Emulsification can be conducted by previously preparing the water phase and the oil phase separately from each other, and then adding the water phase liquid to the oil phase liquid. Alternatively, emulsification can be conducted after the oil phase components are wholly or separately added to the water phase. A known emulsifying machine such as a disper mixer, a homomixer and the like can be used for the preparation.

The ink for inkjet according to the present invention comprises 40 to 99 mass % of an oil phase and 60 to 1 mass % of a water phase. A water-in-oil (W/O) emulsion is difficult to be formed if the percentage of the water phase exceeds 60 mass %. If the percentage of the water phase is below 1 mass %, printing density may be lowered, or strike through may occur in prints. Generally, there is a tendency that the higher the percentage of the water phase is, the higher the viscosity of the ink becomes. Thus, a blending percentage of the two phases is preferably 50 to 98 mass % of the oil phase and 50 to 2 mass % of the water phase and more preferably 55 to 97 mass % of the oil phase and 45 to 3 mass % of the water phase.

The viscosity of the thus-obtained present water-in-oil (W/O) emulsion ink for inkjet at 23° C. is preferably set within the range from 3 to 100 mP·s and more preferably within the range from 5 to 30 mPa·s. The viscosity of the ink can be adjusted by controlling kinds and amounts of the components of the oil phase and an amount of the water phase. Generally, there is a tendency that the lesser the amount of emulsifier is, the lower the viscosity of the ink is, but also the lower the storage stability of emulsion is.

EXAMPLE

Hereinafter, the present invention will be described in detail by way of examples, however, the present invention is not limited to these examples.

Examples 1-8

Comparative Examples 1-2 and Reference Examples 1-5

The pigment and dispersing agent in the amounts shown in Table 1 or Table 2 were mixed with a part of the solvent shown in the same Table, and the pigment was dispersed therein with a Rocking Mill (available from Seiwa Giken Co., Ltd.) to obtain a pigment dispersion. The pigment dispersion was diluted with the remaining solvent, and then a surfactant was dissolved therein to obtain an oil phase. A water-in-oil (W/O) emulsion ink was prepared by dropping a previously-prepared mixture of an ion exchanged water with a polyglycerin according to the composition of Table 1 or Table 2 into the oil phase under stirring at 5000 rpm using a high speed homogenizer "Physcotron" (trade name; available from MICROTEC CO., LTD.), and then continuing the stirring for 5 minutes at 20,000 rpm. Meanwhile, the blending amount of each component shown in Table 1 and Table 3 is shown in part by mass.

The inkjet inks obtained respectively in the above Examples and Comparative Examples were evaluated by the following methods. The evaluation results of these are shown in Tables 1-2.
(1) Ejection Performance Evaluation was made by printing sheets of plain paper "RISO-YOSHI, Usukuchi" (trade name; manufactured by RISO KAGAKU CORPORATION) using a line-head type inkjet printer "ORPHIS HC5500" (trade name; manufactured by RISO KAGAKU CORPORATION). Misfiring of ink was observed after solid image was printed continuously on ten sheets of paper, and evaluated according to the following standards.

A: Little misfire was observed so that almost the same image was printed on the first sheet and the tenth sheet.
B: Many misfires were observed so that the same image was not printed on the first sheet and the tenth sheet.
C: Ejection was impossible or too many misfires were observed so that solid image was difficult to print.

(5) Measured Viscosity (mPas)

Rheometer AR-G2 (available from TA Instruments) was used to measure a viscosity (unit: mPas) of the ink when a 10 Pa shear stress was applied onto the ink. Meanwhile, the lowering rate of the viscosity was calculated in accordance with the following equation.

$$\text{Lowering rate of viscosity (\%)} = \left(\frac{\text{Viscosity in Example}}{\text{Viscosity for comparison}} - 1\right) \times 100$$

TABLE 1

| | | | Kind | Organic value | Inorganic value | HLB | Ex. 1 | Ex. 2 | Ex. 3 | Ex. 4 | Ex. 5 | Ex. 6 |
|---|---|---|---|---|---|---|---|---|---|---|---|---|
| Oil phase | Surfactant | S-FACE IS-1002P | Decaglyceryl diisostearate | 1300 | 1300 | 10.0 | 10.0 | 10.0 | 10.0 | 10.0 | | |
| | | S-FACE IS-401P | Tetraglyceryl monoisostearate | 590 | 620 | 10.5 | | | | | 10.0 | |
| | | S-FACE IS-601P | Hexaglyceryl monoisostearate | 710 | 860 | 12.1 | | | | | | 10.0 |
| | | Decaglyn 3-OV | Decaglyceryl trioleate | 1680 | 1266 | 7.5 | | | | | | |
| | | Rheodol 430V | Polyoxyethylene sorbit tetraoleate | 2760 | 2698 | 9.8 | | | | | | |
| | Pigment | Carbon black MA8 | | | | | 10.0 | 10.0 | 10.0 | 10.0 | 10.0 | 10.0 |
| | Pigment dispersing agent | SOLSPERSE 28000 | | | | | 6.0 | 6.0 | 6.0 | 6.0 | 6.0 | 6.0 |
| | Non-polar organic solvent | AF SOLVENT No. 4 | | | | | 54.0 | 54.0 | 54.0 | 54.0 | 54.0 | 54.0 |
| Water Phase | Ion exchanged water | | | | | | 10.0 | 10.0 | 10.0 | 14.0 | 10.0 | 10.0 |
| | Glycerin | | | | | | | | | | | |
| | Diglycerin | | | | | | | | | | | |
| | Polyglycerin | Tetraglycerin | | | | | 10.0 | | | | | |
| | | Hexaglycerin | | | | | | 10.0 | | | | |
| | | Decaglycerin | | | | | | | 10.0 | 6.0 | 10.0 | 10.0 |
| | | Total | | | | | 100.0 | 100.0 | 100.0 | 100.0 | 100.0 | 100.0 |
| Evaluation | Ejection performance | | | | | | A | A | A | A | A | A |
| | Measured viscosity (mPas) | | | | | | 23.1 | 22.3 | 22.5 | 26.5 | 20.4 | 20.7 |
| | Viscosity for comparison | | | | | | Ref. Ex. 1 | Ref. Ex. 1 | Ref. Ex. 1 | Ref. Ex. 1 | Ref. Ex. 2 | Ref. Ex. 3 |
| | Lowering rate of viscosity | | | | | | −27% | −29% | −29% | −16% | −30% | −30% |

| | | | Kind | Organic value | Inorganic value | HLB | Ex. 7 | Ex. 8 | Comp. Ex. 1 | Comp. Ex. 2 |
|---|---|---|---|---|---|---|---|---|---|---|
| Oil phase | Surfactant | S-FACE IS-1002P | Decaglyceryl diisostearate | 1300 | 1300 | 10.0 | | | 10.0 | 10.0 |
| | | S-FACE IS-401P | Tetraglyceryl monoisostearate | 590 | 620 | 10.5 | | | | |
| | | S-FACE IS-601P | Hexaglyceryl monoisostearate | 710 | 860 | 12.1 | | | | |
| | | Decaglyn 3-OV | Decaglyceryl trioleate | 1680 | 1266 | 7.5 | 10.0 | | | |
| | | Rheodol 430V | Polyoxyethylene sorbit tetraoleate | 2760 | 2698 | 9.8 | | 10.0 | | |
| | Pigment | Carbon black MA8 | | | | | 10.0 | 10.0 | 10.0 | 10.0 |
| | Pigment dispersing agent | SOLSPERSE 28000 | | | | | 6.0 | 6.0 | 6.0 | 6.0 |
| | Non-polar organic solvent | AF SOLVENT No. 4 | | | | | 54.0 | 54.0 | 54.0 | 54.0 |
| Water Phase | Ion exchanged water | | | | | | 10.0 | 10.0 | 10.0 | 10.0 |
| | Glycerin | | | | | | | | 10.0 | |
| | Diglycerin | | | | | | | | | 10.0 |
| | Polyglycerin | Tetraglycerin | | | | | | | | |
| | | Hexaglycerin | | | | | | | | |
| | | Decaglycerin | | | | | 10.0 | 10.0 | | |
| | | Total | | | | | 100.0 | 100.0 | 100.0 | 100.0 |

TABLE 1-continued

| Evaluation | Ejection performance | | | | A | A | A | A |
|---|---|---|---|---|---|---|---|---|
| | Measured viscosity (mPas) | | | | 19.9 | 28.9 | 28.3 | 27.9 |
| | Viscosity for comparison | | | | Ref. Ex. 4 | Ref. Ex. 5 | Ref. Ex. 1 | Ref. Ex. 1 |
| | Lowering rate of viscosity | | | | −32% | −70% | −10% | −12% |

TABLE 2

| | | | Kind | Organic value | Inorganic value | HLB | Ref. Ex. 1 | Ref. Ex. 2 | Ref. Ex. 3 | Ref. Ex. 4 | Ref. Ex. 5 |
|---|---|---|---|---|---|---|---|---|---|---|---|
| Oil phase | Surfactant | S-FACE IS-1002P | Decaglyceryl diisostearate | 1300 | 1300 | 10.0 | 10.0 | | | | |
| | | S-FACE IS-401P | Tetraglyceryl monoisostearate | 590 | 620 | 10.5 | | 10.0 | | | |
| | | S-FACE IS-601P | Hexaglyceryl monoisostearate | 710 | 860 | 12.1 | | | 10.0 | | |
| | | Decaglyn 3-OV | Decaglyceryl trioleate | 1680 | 1266 | 7.5 | | | | 10.0 | |
| | | Rheodol 430V | Polyoxyethylene sorbit tetraoleate | 2760 | 2698 | 9.8 | | | | | 10.0 |
| | Pigment | Carbon black MA8 | | | | | 10.0 | 10.0 | 10.0 | 10.0 | 10.0 |
| | Pigment dispersing agent | SOLSPERSE 28000 | | | | | 6.0 | 6.0 | 6.0 | 6.0 | 6.0 |
| | Non-polar organic solvent | AF SOLVENT No. 4 | | | | | 54.0 | 54.0 | 54.0 | 54.0 | 54.0 |
| Water Phase | Ion exchanged water | | | | | | 20.0 | 20.0 | 20.0 | 20.0 | 20.0 |
| | Glycerin | | | | | | | | | | |
| | Diglycerin | | | | | | | | | | |
| | Polyglycerin | Tetraglycerin | | | | | | | | | |
| | | Hexaglycerin | | | | | | | | | | |
| | | Decaglycerin | | | | | | | | | | |
| | | | Total | | | | 100.0 | 100.0 | 100.0 | 100.0 | 100.0 |
| Evaluation | Ejection performance | | | | | | A | A | A | A | A |
| | Measured viscosity (mPas) | | | | | | 31.6 | 29.0 | 29.4 | 28.1 | 96.4 |

Symbols for raw materials shown in Tables 1-2 mean as follows:
Carbon black MA8 (trade name): Carbon black available from Mitsubishi Chemical Corporation.
SOLSPERSE 28000: Pigment dispersing agent SOLSPERSE 28000 (trade name) available from Lubrizol Japan Ltd.
AF SOLVENT No. 4 (trade name): Petroleum based hydrocarbon solvent available from JX Nippon Oil & Energy Corporation.
S-FACE IS-1002P (trade name): Decaglyceryl diisostearate available from Sakamoto Yakuhin Kogyo Co., Ltd.
S-FACE IS-401P (trade name): Tetraglyceryl monoisostearate available from Sakamoto Yakuhin Kogyo Co., Ltd.
S-FACE IS-601P (trade name): Hexaglyceryl monoisostearate available from Sakamoto Yakuhin Kogyo Co., Ltd.
Decaglyn 3-OV (trade name): Decaglyceryl trioleate available from Nikko Chemical Corporation.
Rheodol 430V (trade name): Polyoxyethylene sorbitol tetraoleate available from Kao Corporation. Glycerin: available from Wako Pure Chemical Industries, Ltd.
Diglycerin: available from Sakamoto Yakuhin Kogyo Co., Ltd.
Tetraglycerin: available from Sakamoto Yakuhin Kogyo Co., Ltd.
Hexaglycerin: available from Sakamoto Yakuhin Kogyo Co., Ltd.
Decaglycerin: available from Sakamoto Yakuhin Kogyo Co., Ltd.

From the results of Table 1, it has been found that ejection performance was improved, and viscosity was greatly lowered by allowing a polyglycerin with a polymerization degree of not less than 3 to be contained in the water phase of the inks in Examples 1-8. In contrast, although ejection performance was improved, high viscosity for inkjet ink was shown by the inks of Comparative Examples 1 and 2. The ink having a high viscosity is not preferred because it must be heated for ejection, thereby increasing the consumption of electricity.

Industrial Applicability

Since the water-in-oil (W/O) emulsion ink for inkjet according to the present invention is excellent in ejection performance and low in viscosity, it can be used as an ink in the field of inkjet printing, particularly for business printers which adopt the line head type inkjet system.

The invention claimed is:

1. A water-in-oil (W/O) emulsion ink for inkjet comprising a water phase and an oil phase, wherein the water phase comprises a polyglycerin with a polymerization degree of not less than 3.

2. The water-in-oil (W/O) emulsion ink for inkjet according to claim 1, wherein said oil phase comprises a polyglycerin fatty acid ester with an HLB value of 7-14 in which the fatty acid moiety of the polyglycerin fatty acid ester is oleic acid or isostearic acid.

3. The water-in-oil (W/O) emulsion ink for inkjet according to claim 1, wherein said oil phase comprises a polyoxyethylene sorbitol fatty acid ester.

4. The water-in-oil (W/O) emulsion ink for inkjet according to claim 1, wherein the polyglycerin is contained in the water phase at a concentration of 10-70 mass % relative to 100 mass % of the whole water phase.

5. The water-in-oil (W/O) emulsion ink for inkjet according to claim 1, wherein the polyglycerin is contained in the water phase at a concentration of 20-65 mass % relative to 100 mass % of the whole water phase.

6. The water-in-oil (W/O) emulsion ink for inkjet according to claim 1, wherein the polyglycerin has a polymerization degree of 4-20.

7. The water-in-oil (W/O) emulsion ink for inkjet according to claim 1, wherein the polyglycerin has a polymerization degree of 4-12.

8. The water-in-oil (W/O) emulsion ink for inkjet according to claim 1, wherein the polyglycerin comprises tetraglycerin, hexaglycerin or decaglycerin.

9. The water-in-oil (W/O) emulsion ink for inkjet according to claim 2, wherein the fatty acid moiety of the polyglycerin fatty acid ester is oleic acid.

10. The water-in-oil (W/O) emulsion ink for inkjet according to claim 2, wherein the fatty acid moiety of the polyglycerin fatty acid ester is isostearic acid.

* * * * *